United States Patent [19]

Österlind

[11] Patent Number: 4,472,860

[45] Date of Patent: Sep. 25, 1984

[54] DEVICE FOR RETAINING CORD-LIKE OBJECTS, PREFERABLY FLEXIBLE ELECTRICAL CORDS AND THE LIKE

[76] Inventor: Hans C. E. Österlind, Smedbacksgatan 7, S-115 39 Stockholm, Sweden

[21] Appl. No.: 339,013

[22] Filed: Jan. 12, 1982

[30] Foreign Application Priority Data

Jan. 13, 1981 [SE] Sweden .................. 8100163

[51] Int. Cl.³ .................................... F16G 11/00
[52] U.S. Cl. ........................ 24/129 R; 24/115 R; 24/129 B; 24/304; 248/74.1; 248/205.3; 248/300; 248/65
[58] Field of Search ........... 24/304, DIG. 8, 115 R, 24/129 R, 115 A, 129 B, 129 C, 130, 131 R; 248/205.3, 74.1, 74.3, 74.8, 51, 65, 300

[56] References Cited

U.S. PATENT DOCUMENTS

| 882,835 | 3/1908 | McGillivray | 248/300 |
|---|---|---|---|
| 1,056,596 | 3/1913 | Sidoli | 245/65 |
| 1,920,520 | 8/1933 | Nord | 248/300 |
| 2,006,843 | 7/1935 | Russell | 24/DIG. 8 |
| 2,580,282 | 12/1951 | Colley | 248/300 |
| 3,074,677 | 1/1963 | Eckhardt | 248/205.3 |
| 3,178,138 | 4/1965 | Hessdoerfer et al. | 248/205.3 |
| 3,345,709 | 10/1967 | Bearman | 248/205.3 |
| 3,409,257 | 11/1968 | Elm | 248/65 |
| 3,491,971 | 1/1970 | Fisher | 248/65 |
| 4,067,526 | 1/1978 | Storer | 248/65 |

Primary Examiner—Gene Mancene
Assistant Examiner—David I. Tarnoff
Attorney, Agent, or Firm—Flynn, Thiel, Boutell & Tanis

[57] ABSTRACT

The invention relates to a holder device for electrical cords or flexible leads, especially in rooms for dwelling and working. The device comprises a plate (1) provided with at least one flange (2) projecting therefrom, with a coating of self-adhesive material (4) applied to the plate on the same side as the flange and downwards thereof. The holder device is intended for mounting on skirting (6) so that the flange (2) constitutes guidance and location means while applying and attaching the plate to the skirting by means of the self-adhesive coating. The portion of the plate upstanding from the flange is intended, together with the opposing wall surface (7) and the upper edge of the skirting, to form a trough-like section for laying a cord (11) and/or retaining the appropriate cord portion.

15 Claims, 12 Drawing Figures

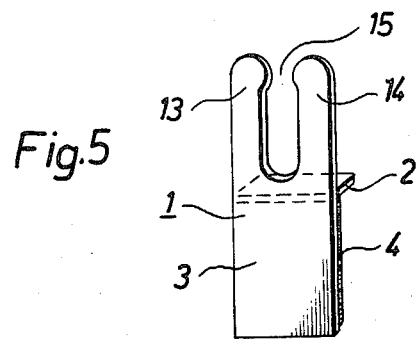
Fig.5
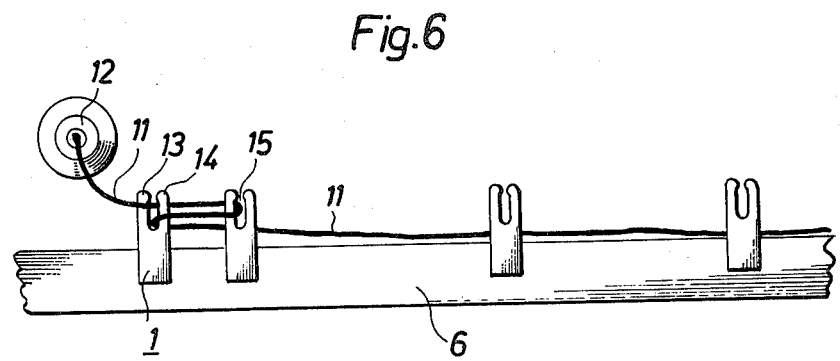
Fig.6
Fig.7
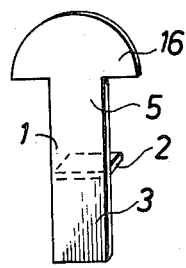
Fig.8
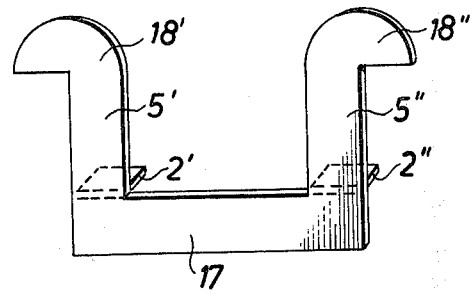

DEVICE FOR RETAINING CORD-LIKE OBJECTS, PREFERABLY FLEXIBLE ELECTRICAL CORDS AND THE LIKE

In living space it is desirable as far as possible to keep floor areas free from loose electrical flex, leads, cords or the like (hereinafter designated cords). For example, when connecting a floor lamp to a wall socket, it is suitable to take the cord from the floor lamp to the nearest skirting board, and along the latter to the point of electrical connection. A plurality of solutions have been proposed for retaining such cords along skirting, and most of them are formed as some kind of clip, trough or the like. Troughs which are attached to skirting often have the disadvantage that they collect dust which can be difficult to suck up during cleaning. It is therefore desirable to apply some form of holder to the skirting, this holder being formed such that a cord can easily be placed between holder and wall, while utilizing the upper portion of the skirting as substructure. Such holders can suitably be formed as plates which have been placed against an outer surface of the skirting and which project above the top edge thereof. It is generally necessary to use a plurality of such holders to keep one or more cords in place. In rooms for dwelling, it is of particular importance from the point of view of appearance that fixing such holders is uniform. The present invention intends, inter alia, to solve this problem.

The device in accordance with the invention comprises a plate, from one side of which one or more flanges project. The plate is adapted for fixing to, for example, a skirting board, the flange or flanges being arranged during the fixing movement to glide over the upper edge of the skirting so that when the plate has come against the skirting, correct orientation and height are automatically obtained for the plate, such that the portion thereof projecting above the flange may serve as a holder for a cord, and together with the appropriate portion of wall may also form a trough-like section.

What is characterizing for the present invention is disclosed in the following patent claims.

The invention will now be described in detail while referring to the appended drawings on which FIG. 1 is an embodiment of the invention seen from the front;

FIG. 5 is a perspective view of a second embodiment of the invention;

FIG. 6 illustrates to a smaller scale the use of devices according to FIG. 5 when fixed to a skirting board;

FIG. 7 illustrates a third embodiment in perspective view;

FIG. 8 illustrates a fourth embodiment, particularly suited for use as a cord "shortener";

Figure 1:
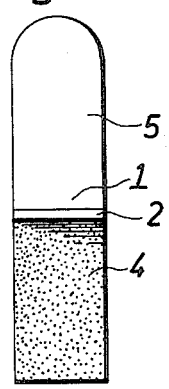
Figure 2:
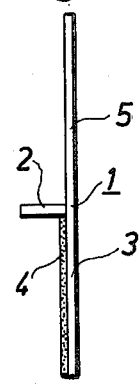
FIG. 2 is a side view of the embodiment in FIG. 1.

The device illustrated in FIGS. 1 and 2 comprises a plate 1, suitably of a transparent plastics material, from which a flange 2 projects out at right angles from one side. In the Figure, the lower part 3 of the plate is coated with preferably transparent, self-adhesive material 4 on the side provided with one or more flanges. The upper part 5, with respect to the flange 2, of the plate 1 does not have any coating.

Figure 3:
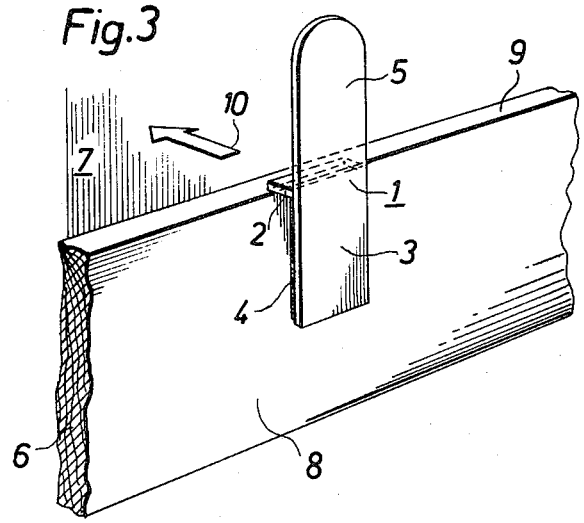
FIG. 3 is a perspective view of the device in FIGS. 1 and 2, during application to a skirting board.

A length of skirting 6 against a wall surface 7 is illustrated in FIG. 3. The skirting has an outward surface 8 and an upward edge surface 9.

Fixing a device in accordance with FIGS. 1 and 2 is performed in the following mode. The underside of the flange 2 is brought into contact with the upper edge surface 9, and the plate 1 is then pushed in the direction of the arrow 10 until the self-adhesive coating 4 comes into contact with the front surface 8 of the skirting 6. The part 3 of the plate 1 is now pressed against the skirting in this position and the self-adhesive coating 4 adheres to the skirting. The part 5 of the plate 1 projecting above the flange 2 will, in the position now attained, form a trough-shaped section together with the edge surface 9 and opposing wall surface 7, in which a cord can easily be laid.

Figure 4:
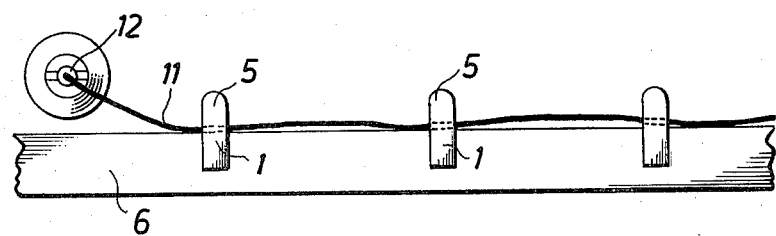
FIG. 4 illustrates to a smaller scale of a plurality of holders in accordance with the invention on a skirting board.

In FIG. 4 there is shown a plurality of holder devices according to the above-mentioned Figures, mounted on a skirting 6, and retaining a cord 11 which is plugged into a wall socket 12. The other end of the cord is assumed to be connected to some appliance (not shown) or lamp. By arranging the flange 2 on the plate 1, there is obtained guidance of the plate during fixing and location thereof in its right position, as well as uniform fixing which is important from the point of view of appearance, especially in rooms for dwelling, as already mentioned. If the plate 1 is made from a crystal-clear plastics material and the outwardly facing corner edges are rounded off, the impression obtained will not be so obvious or undecorative, since edge reflexions are then also considerably reduced.

In the embodiment according to FIG. 5, the same designations have been used for portions corresponding to those in FIGS. 1 and 2. As previously, the upper part of the holder device is denoted by the numeral 5, and is here formed with two limbs 13, 14 forming between them a cutout 15. The use of said cutout is clearly apparent from FIG. 6. It is often the case that cords between a floor lamp and a wall socket are too long, resulting in that the rest of the cord wanders about the floor, which is untidy and troublesome, e.g. in connection with cleaning. It is therefore desirable to shorten the cord in such a case, and this may be done in accordance with the invention, as illustrated in FIG. 6, which shows a plurality of the devices according to FIG. 5 mounted on a skirting 6. In FIG. 6, the cord is taken through the cutout 5 between two holders which are placed a short distance from each other and goes backwards and forwards, thus providing desired its shortening. As will be seen from the figure, this method of shortening is simple and to the purpose, while at the same time the cord is kept in place by it being thrust down into the cutout 15 between the limbs 13, 14.

Of course, it is possible to shorten a cord with a device according to FIGS. 1-4 also, by mounting two holders close to each other and winding up a length of cord between them. It must, however, be kept in mind that the plastics-insulated cords now generally used in households are often stiff, and it may consequently be difficult to keep them in place between two of the devices as depicted in FIGS. 1 and 2. It is therefore advantageous in such cases to use devices with a cutout 15, as shown in FIGS. 5 and 6. Fixing the device according to FIG. 5 is done in the same way as what has been described for FIG. 3.

A further solution of the problem is to use a device as shown in FIG. 7. As will be seen from the figure, the upper part 5 is outwardly formed with a hat-like portion 16, but is otherwise formed as the device according to FIGS. 1-4. If two such holders are mounted close to each other, similar to the two left-hand ones in FIG. 6, a cord can be wound between them and the hat-like portions 16 form stops for the length of cord in question, so that it does not slip off the holder devices.

The embodiment according to FIG. 8 serves the same purpose of shortening a cord, as described above. The device comprises two upstanding portions 5' and 5", corresponding to the parts 5 in previous embodiments, and it is also provided with projecting flanges 2' and 2". The parts 5' and 5" are kept together by a part 17 provided with self-adhesive material (not shown) in the same way as the part 3. Parts 5' and 5" are upwardly formed with hook-like portions 18' and 18". As mentioned, the device is intended for use in winding up portions of cord, e.g. with the cord being wound from the part 5' to the part 5", and back again to 5', with as many turns as is required. The device has the advantage that the cord can be wound relatively tightly against parts 5' and 5", since these are rigidly connected to each other via the part 17. In the previously described embodiment, it is the strength of the self-adhesive material which limits the lateral stresses. As will be seen below the devices in question may be nailed to the skirting board.

As mentioned, some types of plastics-sheathed cords are relatively stiff and unmanageable even at room temperature. If such cords are to be retained by devices as described above, i.e. placed in the trough-like portion between wall and plate, it easily happens that even though the cord has been laid correctly in coaction with the holder devices, it will run along the skirting in an unsightly manner. A device is therefore shown in FIGS. 9 and 10 with the aid of which this problem may easily be solved. The device now under consideration, similarly to the previous embodiments, comprises a plate 1 with a lower part 19 and an upper part 20, the latter being formed with three limbs 21, 22 and 23, which are parallel and form a trident configuration. The limb 22 is somewhat longer than limbs 21 and 23. Two flanges 24, 25 project at right angles to the plate from the middle section thereof. A layer 26 of self-adhesive material is applied to the lower part 19 on the same side of the plate as the flange. As in the other embodiments, the plate with its part 19 is adapted for moving into coaction with a skirting board 27 so that the self-adhesive material 26 bonds the plate to the skirting, as will be clearly seen from FIG. 10.

Figure 9:
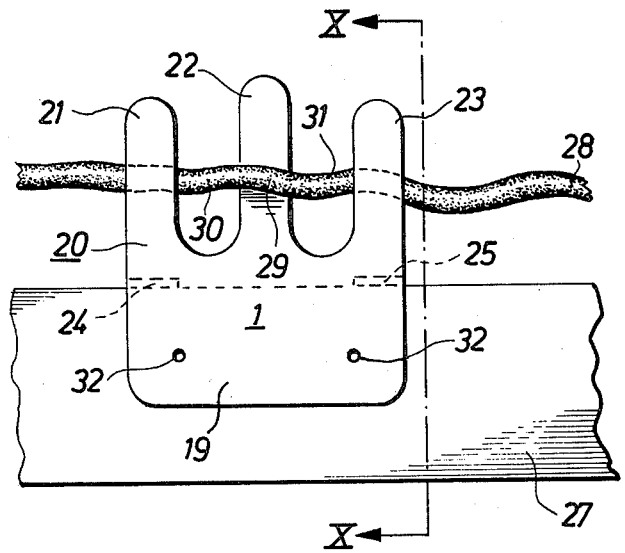
FIG. 9 illustrates a fifth embodiment of the invention.

In the case illustrated, the device is intended for retaining a cord 28 in a mode clearly apparent from FIG. 9. When the cord 28 is laid out, the portion 29 thereof, which is to coact with the limb 22, is moved into coaction with the upper part of said limb. The contiguous portions 30 and 31 of the cord are then arranged so that they come behind the limbs 21 and 23 as seen in FIG. 9, to give the cord an S-shape through the device. In the position illustrated in FIG. 9, the cord is well fixed in the holder device, and if a plurality of such devices are used consecutively along a skirting board, even a very stiff cord can be retained and tensioned between the different holders, thereby achieving a tidy effect. In certain cases it can be suitable to fix devices according to FIGS. 1-4 between the devices according to FIGS. 9 and 10, to hold the stretched cord in towards the wall portion.

Figure 10:
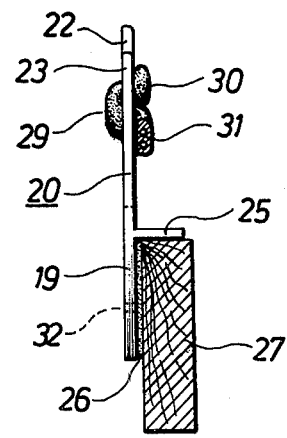
FIG. 10 is a section along the line X—X in FIG. 9.

The device according to FIGS. 9 and 10 can, of course, be used for shortening a cord by winding it up between the limbs. If very heavy and unmanageable cords, cables or bunches of cables are to be retained, it may be more suitable to nail or screw the plate to the skirting, and for this purpose the holes 32 made in the lower part 19 may be used. A variant of the device can be conceived, where the upper portions of the limbs 21 and 23 are formed as is proposed for the FIGS. 7 or 8, i.e. having a hook-like configuration.

In practice it is suitable to form the device in a material such that the limbs 21, 22 and 23 are somewhat resiliently flexible. The proportions shown on the drawing have been found to be suitable in practice, although in some connections it may be advantageous to extend the limb 22 to a greater extent than is shown in FIG. 9.

Figure 11:
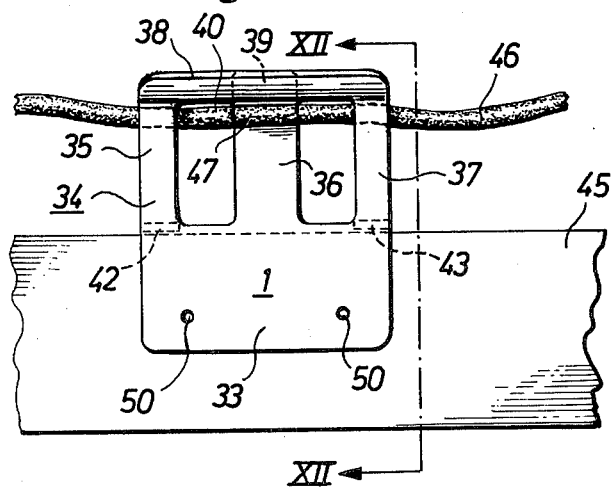
FIG. 11 is a front view of a sixth embodiment of the invention.
Figure 12:
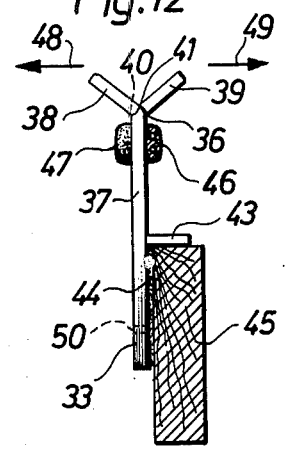
FIG. 12 is a section along the line XII—XII in FIG. 11.

The problem of keeping stiff and unmanageable cords in place has been discussed above, and although the embodiments already described may very well meet the requirement of keeping kinky cords in place, the embodiment according to FIGS. 11 and 12 provides another effective solution to the problem of locking a portion of cord to a holder device. This device, similar to the previous ones, comprises a plate 1 with a lower part 33 and an upper part 34. As with the embodiments according to FIGS. 9 and 10, it is formed with three limbs 35, 36 and 37, which are upstanding and mutually parallel. As distinguished from the embodiment according to FIGS. 9 and 10, the outer limbs 35 and 37 are joined by means of an upper piece or yoke 38. As will be clearly seen from FIG. 12, this yoke 38 is bent away outwardly at an angle in relation to said limbs 35 and 37. The middle limb 36 also has an upper portion 39 outwardly bent, in the opposite direction to the yoke 38, the portions 38 and 39 thus forming a V-shape seen from one end, as is depicted in FIG. 12. The bottom portion of the yoke forms a sharp edge 40 facing towards the bent portion 41 of the middle limb 36 at its juncture with the outwardly bent portion 39. The edge 40 and the bent portion 41 are very close to each other. From the middle portion of the plate 1 there are two flanges 42 and 43 projecting out at right angles, as with the embodiments already described. A layer 44 of self-adhesive material is applied to the lower part 35 on the side of the plate with the flange. As in the cases already mentioned, the plate with its part 35 is adapted for moving into-coaction with a skirting board 45 so that the self-adhesive material 44 bonds the plate to the skirting as shown in FIG. 12.

In the case shown, the device is intended to retain a cord 46 in a mode clearly apparent from FIG. 11. The insertion of cord 46 is executed by the portion 47 of the cord 46, which is to be kept in place, being moved into coaction with the outwardly bent portion 39 of the middle limb 36. The portion 47 is then pressed down into the V-shaped groove formed by the yoke 38 and the portion 39, so that the limbs 35 and 37 as well as the limb 36 are urged to part resiliently, as indicated by the arrows 48 and 49 in FIG. 12. When the portion 47 has passed over the edge 40 and the bent portion 41 of the leg 36, it glides down and positions itself as shown behind the limb 37, in front of the limb 36 and once again behind the limb 35. Since the portion 47 has come below the edge 40 of the yoke 38, and the limb 36 has swung in, together with the limbs 34, 35, so that the edge 40 and end portion 41 once again lie close to each other, there is automatically provided an entrapment of the cord portion 47. Practical trials have shown that the entrapment is very effective, since attempts to remove the cord result in that the portion 47 directly coacts with sharp edges in the yoke 38. However, by pulling further on the cord it may be removed without damage.

As with the embodiment according to FIGS. 9 and 10, this embodiment is also provided with attachment holes 50 made in the lower part 33. Bearing in minding that the embodiment now described will often be used for heavier fixation of cords it may be as well to fix the device more firmly to a skirting board.

The configurations of the plate 1 illustrated in the Figures can naturally be varied within wide limits, all according to the type of application. The upper parts thereof can have other configurations than what has been proposed. For example, the upper portion of said plate may be bulged outwards to contain more cords between wall and holder. The whole of the upper portion of the plate can also be bent inwards so that kinky cord portions do not work their way out of engagement with the holder, and the bottoms of curtains and such like are not so easily caught in the holders. In practice, it can be suitable to provide the flanges with fractural scores parallel to the plane of the plate, so that the limb length of the flange can be adjusted to the thickness of the skirting board in question, when excessive flange width is broken or clipped off along the scores. It should also be understood that the invention is applicable to other types of substructure than skirting boards. The flanges which are apparent on all embodiments throughout may in case the devices are made in steel plate or the like be constituted by material portions pushed out between the limbs and bent at right angles.

I claim:

1. A device for retaining elongated flexible objects, such as electric cords along a skirting board fixed along a wall in a room, said device comprising:
    a plate;
    at least one flange projecting from said plate and dividing the plate into two parts;
    means including a first said part of the plate for attaching the plate to the skirting board;
    means including the second said part of the plate for supporting the cord along the skirting board and comprising a channel-shaped cord receiving zone between said second part and an opposing portion of the wall, said flange aligning the device in relation to an edge surface of the skirting board, said first part of the plate being provided with a self-adhesive material on the same side of the plate as the flange, and up to the flange, for said attaching to said skirting board.

2. Device as claimed in claim 1, wherein said second part of the plate is substantially flat, for forming a surface substantially parallel to said opposed wall portion.

3. Device as claimed in claim 1, wherein said second part of the plate comprises two limbs spaced by a cut-out for accommodating a cord.

4. Device as claimed in claim 3, wherein the limbs are provided at their extremities with portions projecting towards each other so that the cut-out is narrowed in the vicinity of these projecting portions.

5. Device as claimed in claim 1, wherein said second part has an upper free portion with an outwardly curving shape to form a wider troughlike zone in conjunction with said opposing wall portion.

6. Device as claimed in claim 1, wherein said second part has an upper free portion bent inward towards said opposing wall portion.

7. Device as claimed in claim 1, wherein said second part is formed with at least three limbs for entrapping a said cord.

8. Device as claimed in claim 7, wherein the middle limb is somewhat longer than the remaining ones for facilitating the insertion of the appropriate portions of a cord.

9. A device for retaining elongated flexible objects, such as electric cords along a skirting board fixed along a wall in a room, said device comprising:
    a plate;
    at least one flange projecting from said plate and dividing the plate into two parts;
    means including a first said part of the plate for attaching the plate to the skirting board;
    means including the second said part of the plate for supporting the cord along the skirting board and comprising a channel-shaped cord receiving zone between said second part and an opposing portion of the wall, said flange aligning the device in relation to an edge surface of the skirting board, said second part being formed with at least three limbs for entrapping a said cord, said plate having an extension forming said second part and including the three limbs, and being provided in its middle portion with two separate said flanges, one at either end.

10. A device for retaining elongated flexible objects, such as electric cords along a skirting board fixed along a wall in a room, said device comprising:
    a plate;
    at least one flange projecting from said plate and dividing the plate into two parts;
    means including a first said part of the plate for attaching the plate to the skirting board;
    means including the second said part of the plate for supporting the cord along the skirting board and comprising a channel-shaped cord receiving zone between said second part and an opposing portion of the wall, said flange aligning the device in relation to an edge surface of the skirting board, said second part being formed by at least three limbs laterally spaced apart for intertwined entrapping the associated cord, upper portions of both outer ones of said limbs being joined to each other by an upper yoke for locking coaction with an intermediate said limb for locking retention of a cord portion.

11. Device as claimed in claim 10, wherein said yoke forms an angle with the plane of its supporting limbs, an upper portion of the intermediate limb similarly forming an angle to the plane of the limbs but is oriented in the opposite direction to and away from the yoke, whereby the yoke and the angled upper portion of the middle limb coact to form a locking portion for an entrapped cord portion intertwining through the spaces between the limbs.

12. Device as claimed in claim 10, wherein the limbs are made from a resilient material.

13. A device for retaining elongated flexible objects, such as electric cords along a skirting board fixed along a wall in a room, said device comprising:
 a plate;
 at least one flange projecting from said plate and dividing the plate into two parts;
 means including a first said part of the plate for attaching the plate to the skirting board;
 means including the second said part of the plate for supporting the cord along the skirting board and comprising a channel-shaped cord receiving zone between said second part and an opposing portion of the wall, said flange aligning the device in relation to an edge surface of the skirting board, said second part being formed with at least three limbs for entrapping a said cord, the device being made of a steel plate material, wherein material portions extend between the limbs and constitute parts being out from the plane of the device to form a flange.

14. A device for retaining elongated flexible objects, such as electric cords along a skirting board fixed along a wall in a room, said device comprising:
 a plate;
 at least one flange projecting from said plate and dividing the plate into two parts;
 means including a first said part of the plate for attaching the plate to the skirting board;
 means including the second said part of the plate for supporting the cord along the skirting board and comprising a channel-shaped cord receiving zone between said second part and an opposing portion of the wall, said flange aligning the device in relation to an edge surface of the skirting board, said second part being formed with at least three limbs for entrapping a said cord, intermediate portions of said three limbs being spaced sideways from each other along the top edge of said first part of said plate for interweaving of the cord thereamong, said limbs being resiliently bendable, the intermediate portion of said limbs normally being substantially in the same plane with said first part and extending fixedly upward from said first part, upper ends of said limbs being bent out of said plane with the bent upper end of the middle limb extending generally in opposite direction away from the bent upper ends of the two end limbs to help guide a cord to be inserted downward into interwoven relation with the intermediate portions of said limbs, the bent upper end of at least one said limb being wider than the intermediate portion of said one limb so as to extend generally toward the next limb and at least partly close the top of the space separating the intermediate portions of said one and next limbs.

15. Apparatus comprising in combination:
 a skirting board fixed along the wall of a room;
 an elongate flexible cord to be carried along an edge of said skirting board;
 devices spaced along said cord and skirting board for retaining said cord against said skirting board, a said device comprising a plate, at least one flange projecting from said plate and dividing the plate into two parts, means including a first said part of the plate for attaching the plate to the skirting board such that the first part and flange face the side and edge of the skirting board, means including the second said part of the plate being for supporting the cord in extended condition along said skirting board and comprising a channel-shaped zone between said second part and an opposing portion of said wall, said zone being floored by said flange and skirting board edge, said flange aligning said device in relation to said edge of said skirting board, the width of said device measured along said cord and skirting board being relatively small for spacing apart plural ones of said devices along said skirting board to maintain alignment of said cord along said skirting board, said second part comprising at least three limbs for entrapping the cord, intermediate portions of said three limbs being spaced sideways from each other along the top edge of said first part for interweaving of said cord through the spaces therebetween, said limbs being resiliently bendable to facilitate said interweaving of said cord thereamong, the intermediate portions of said limbs normally being substantially in the same plane with said first part and extending fixedly upward from said first part and together occupying substantially the same width along said skirting board as said first part, the upper ends of said limbs being bent out of said plane with the bent upper end of the middle limb extending generally away from the bent upper ends of the two end limbs to help guide a cord to be inserted downward into interwoven relation with the intermediate portions of said three limbs, the bent upper end of at least one said limb being wider than the intermediate portion of said one limb so as to extend generally toward the next limb and at least partly close the top of the space separating the intermediate portions of said one and next limbs to releasably lock in the interwoven cord.

* * * * *